Aug. 21, 1934.  B. C. STICKNEY  1,970,714
COMBINED TYPEWRITING, COMPUTING, AND CARD PERFORATING MACHINE

Filed April 4, 1930  3 Sheets-Sheet 1

INVENTOR
Burnham C.
Stickney

Aug. 21, 1934.  B. C. STICKNEY  1,970,714
COMBINED TYPEWRITING, COMPUTING, AND CARD PERFORATING MACHINE
Filed April 4, 1930  3 Sheets-Sheet 3

Fig. 6.

Inventor:
Burnham C. Stickney

Patented Aug. 21, 1934

1,970,714

UNITED STATES PATENT OFFICE 1,970,714

COMBINED TYPEWRITING, COMPUTING, AND CARD-PERFORATING MACHINE

Burnham C. Stickney, Hillside, N. J., assignor to Underwood Elliott Fisher Company, New York, N. Y., a corporation of Delaware Application April 4, 1930, Serial No. 441,497

30 Claims. (Cl. 235—60)

This invention relates to combined typewriting, computing and card-punching machines, and is illustrated in connection with an Underwood bookkeeping machine in which there is employed a plurality of registers which may be operated singly or simultaneously.

Numeral-keys of the typewriter co-operate with the typewriter-carriage to operate an indexing mechanism. The carriage determines the denominations, and the keys determine the digits that are to be typed and computed in any denomination. After the keys have indexed a number, the same is run into one or more registers or totalizers by means of a general operator.

Punching mechanism has been heretofore added to a standard Underwood bookkeeping machine, so that the same computing bars which drive the register-wheels are caused to set correspondingly certain plunger-operators to different positions, corresponding with the numbers that are being run into the dial-wheels of the registers. After such automatic setting of the punch-operators, a device is operated to bring them down upon the selected punches to perforate a record-card accordingly.

The present invention relates to means for improvement in indexing or setting the plunger-operators in such a manner as not to impair the capacity of the machine in any way in operating any or all of the registers, and to avoid overburdening the typewriter-carriage. According to the present invention there may be used in the machine two, three, four or more registers, and a number may be run into any register, and at the same time the corresponding set-up may be effected of the punch-operating plungers. Moreover any two or more registers may be operated simultaneously, according to the indexing performed at one typing of a number on the work-sheet, and the corresponding setting of the punch-plungers may be effected automatically, without interfering in any way with the operation of any totalizer in the machine. If desired, the same number that is typed on the work-sheet may be run into all the totalizers, and also punched in the card.

Upon the typewriter-carriage is provided a selector-dog, which depresses seriatim the jacks in a series, and these jacks displace the racks in a set, each rack carrying a row of digit-pins. This displacement of a jack is maintained while the carriage is being held stationary at the conclusion of a letter-spacing operation. During the typing of a digit, a pin is displaced on the rack or bar. One after another pins may be thus selectively displaced upon the racks or bars.

In practicing the present invention, there may be used a single set of jacks for a plurality of registers. This single set of jacks operates a downwardly-extending set of rods, which are conected individually to rock-shafts ranging across the machine. There is one rock-shaft for each denomination, and each rock-shaft has an arm or tappet for displacing the corresponding pin-bar, as just explained. However, all of the pin-bars are normally elevated and silenced, but the typewriter-carriage may selectively drop a gang of pin-bars into working position. Any one, or two, or three, or more pin-bar gangs may be dropped, according to the controlling devices which are set up on the typewriter-carriage, so that when a number is typed in a given zone on the work-sheet, said number is run into any one or any two or more of the registers or totalizers. A feature of the invention is the provision whereby said single set of jacks, which are easily operated by the typewriter-carriage, may also serve for controlling the selection of the punches, without adding anything to the burden placed upon the typewriter-carriage.

In one manner of practicing the present invention, all of the pin-bars are normally out of reach of the denomination-selecting jack-trains, but the pin-bars for each register are brought into co-action with the jack-trains at the proper time. This is done in each instance by means of an individual cam operable by the typewriter-carriage. This cam is held depressed, and the pin-bars accordingly function so long as the carriage is traversing the typing zone which is involved.

As just explained, two or more sets of pin-bars may be brought simultaneously into use for co-operation with the jack-trains, by the use of an individual cam for each set of pin-bars, so that computation may proceed in several registers simultaneously.

Said cams may be carried upon blocks that are mounted on the carriage, and the same blocks may carry the denominational selecting dogs. There may be provided for each machine a plurality of blocks; each block having one, two or three cams. Said blocks may be formed with column-stops, and may be adjustable along a rack for arresting the carriage at the tabulating operation.

The provision of the transverse rock-shafts in the jack-trains permits the placing of a register mechanism at the extreme right or the extreme left portion of the machine, while the jacks remain at the middle of the machine.

As the typewriter-carriage travels from right to left, the denominational selecting dog acts first upon the right-hand jack, which must, therefore, be included in the highest denominational train. Since the right-hand wheel in the register is a units wheel, transposition is effected without the necessity for providing the usual transposition device. To this end, rods are connected at their lower ends to arms on the transverse rock-shafts of appropriate denominations, and extend directly up to the denominational jacks, so that a denominational train comprises only the jack, the rod, the rock-shaft, and the pin-bar.

From each gang of pin-bars extends rearwardly a set of couplers that are normally elevated and silenced. When any gang of pin-bars is dropped to operating position, the couplers are also dropped, and they connect with devices for setting individually the plungers which are subsequently operable for driving the punches.

Since the couplers extend back from the pin-bars for the purpose of coupling the latter to the punch-selectors, and since the couplers fall into connection with the punch-selectors when the pin-bars fall into position for co-operating with the denomination-selecting rock-shafts, it results that the bars and couplers are carried forward by the general operator, the couplers to the same extents as the pin-bars, whereby the punch-selectors are variously set. The punch mechanism is therefore controlled, as well as all of the registers, by means of a single set of denomination-jacks.

At the operation of the general operator, all of the pin-bars (which are provided on their front ends with racks) are caused to drive the wheels of the registers, and the couplers at the same time set the punch-plungers accordingly. Then there comes into play a power-driven universal operator for the punch-plungers, which drives them down, so that the punches selected thereby are forced through the card.

Other features and advantages will hereinafter appear.

In the accompanying drawings.

The typewriting mechanism comprises alphabet type-keys 10 and digit type-keys 11, mounted on levers 12, which by means of bell-cranks 13 drive type-bars 14 against a platen 15, the latter mounted on a carriage 16 which is driven by a spring 135 along front and rear guide-rails 17, 18. Its letter-feeding movements are controlled by a rack 19, meshing with a pinion 20, the latter connected to an escapement-wheel 21 which is controlled by dogs 136. Vibration of the dogs is effected by universal bar 137 which is operated by the type-bars, as in Hart Patent No. 1,281,953, of October 15, 1918.

From each of the digit type-keys 11 depends a stem 27, which is depressible to engage an arm 28 on a rock-shaft 29, one rock-shaft for each key. These rock-shafts 29 individually operate linkages 30, which are connected to arms 31 on the rock-shafts, and indexing links or digit bars 32, which are also connected through linkages 30 to the arms 31, and are depressed thereby for the purpose of depressing indexing pins 33. Said pins are carried upon forwardly and rearwardly extending denominational computing elements, which may be in the form of pin-bars 34, as in said Hart patent, and which act as drivers for registers 88.

After a number is typed and its corresponding index-pins are set, a general operator 35 is operated, which may be power driven. The general operator includes a transverse bar 41, which, as it moves forward, engages the indexed or depressed pins 33, and, by means of racks 34ª on the forward ends of the pin-bars, drives the register-dials accordingly. The pins 33 are all normally out of the paths of the digit-bars 32, but each column of pins may be brought into said paths by displacing forwardly the pin-bar 34 which carries said pins.

The foregoing numbered parts are common in the Underwood bookkeeping machine.

Each of the pin-bars 34 carries a pin 42, whereby it may be set or displaced forwardly. These pins may be in the paths of arms 43 that extend upwardly from a series of horizontal transverse rock-shafts 44, so that, when any shaft is rocked, its arm 43 is rocked and its corresponding pin-bar is displaced forwardly, to bring its column of index-pins 33 into the paths of the depressible indexing bars or links 32.

Figures 4, 5:
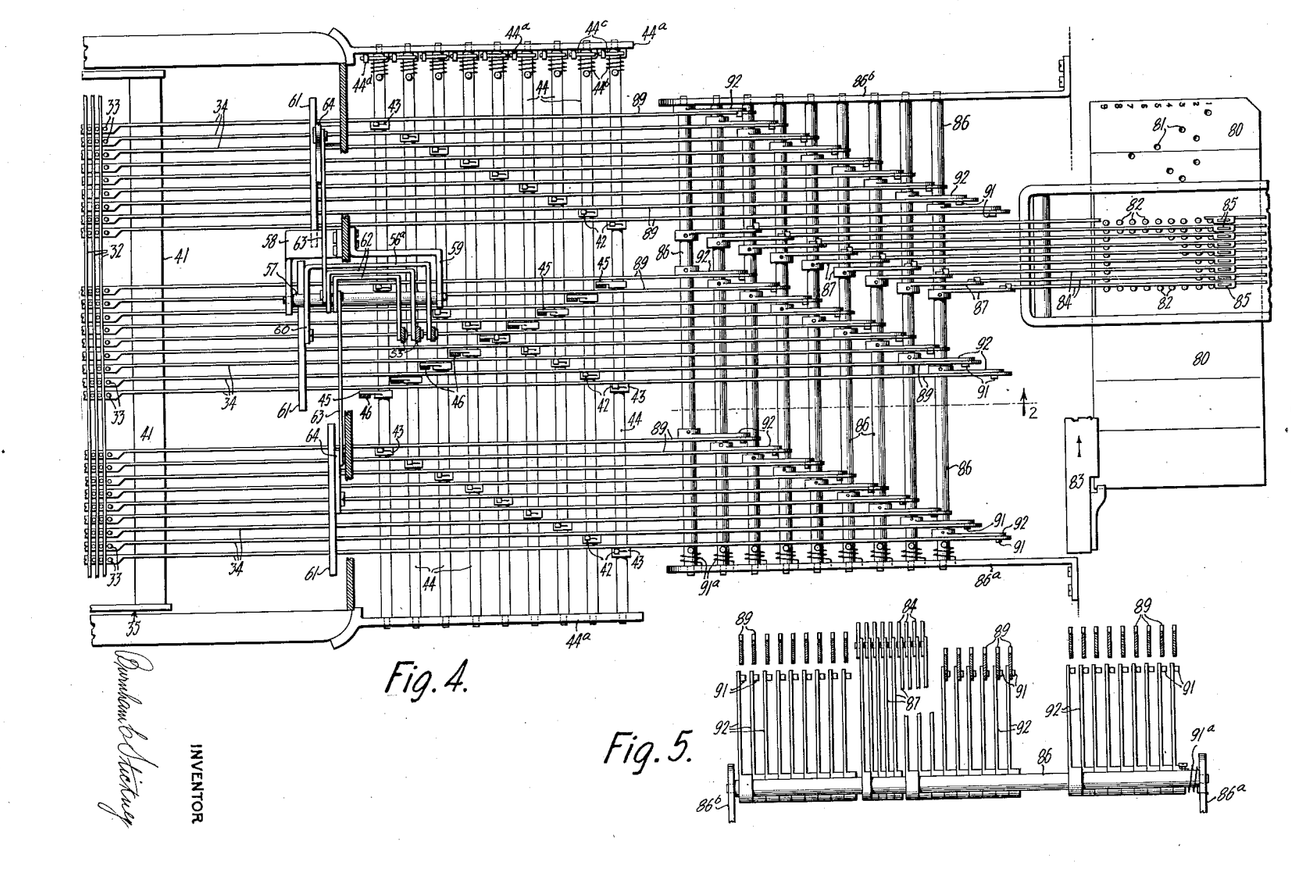
Figure 4 is a sectional plan, showing three gangs of register-operating bars, with the couplers which connect them to the rock-shafts of the punch-selecting mechanism, and the means whereby the rock-shafts effect the individual adjustments of the punch-operating plungers in the set.
Figure 5 is a sectional front elevation, showing the rock-shafts, arms, etc.
Figure 6:
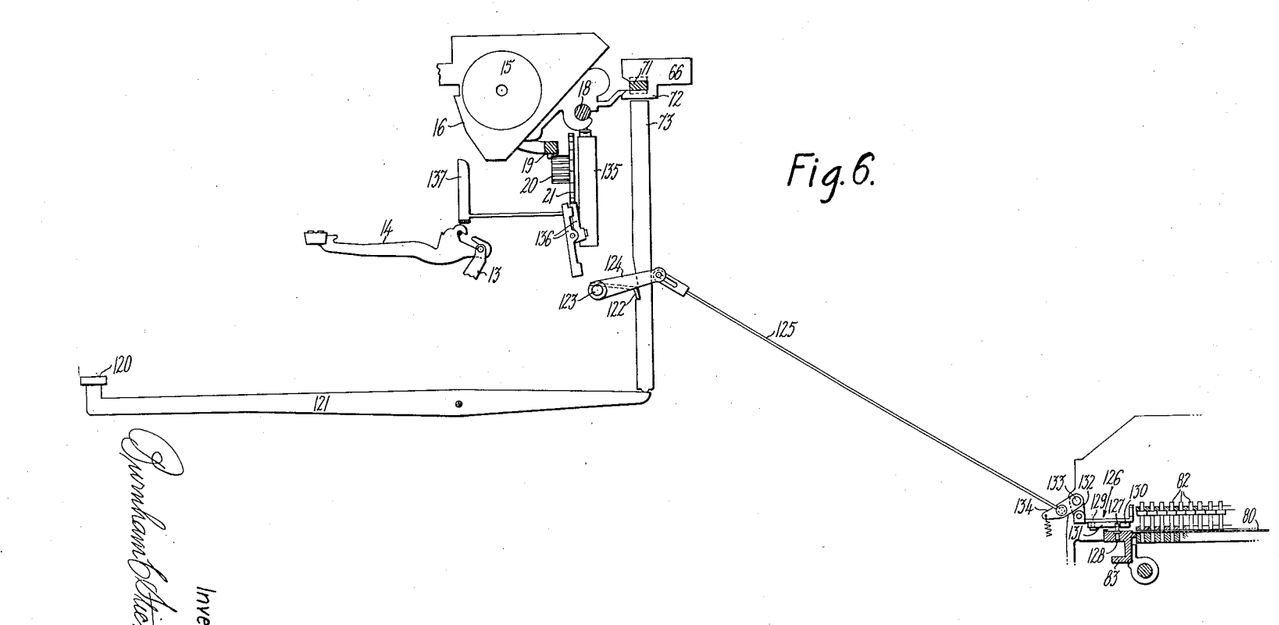
Figure 6 shows the typewriter-carriage and tabulating mechanism together with the connection to the card-perforating carriage.

The rock-shafts 44 are mounted on brackets 44ª fixed to the machine-frame, and are normally pulled by springs 44ᵇ in a clockwise direction, as seen in Figure 4, to cause stops 44ᶜ on the shafts to engage with stops 44ᵈ on one of the brackets, to thus hold said shafts in their normal positions.

Each of the rock-shafts 44 is provided with a controlling arm 45, to which is pivoted the lower end of a rod 46, the rods extending upwardly and being suitably guided in a plate 47 near their upper ends.

To depress the rods 46, there is provided a set of jacks 48, each pivoted between its ends, the forward end 49 of each jack having a tooth 50, which is engageable by a dog 51 upon the typewriter-carriage. The dog lifts the jacks one after another as the carriage is passing through the computing zone, while typing is being done in the desired column on the worksheet.

As the front end of any jack is lifted, its rear depresses its rod 46 and rotates the connected rock-shaft 44. By means of these jack-trains, the pin-bars 34 may be properly advanced or displaced one set after another, as the typewriter-carriage proceeds step by step through the computing zone.

Each of the transposing rock-shafts 44 carries an arm 43 to drive the corresponding pin-bar 34 in every register-set, of which, for example, three are illustrated, so that indexing pins may be set simultaneously in all the registers by the use of only one set of jack-trains.

The machine may operate in any selected single register, or in only two registers, or in all three registers, when typing in any zone. For this purpose, any one or more sets of pin-bars 34 may be disconnected from the jack-trains. The connection and disconnection may be effected automatically. All of the sets of denominational bars may be held normally up with the pins 42 at their rear ends out of reach of arms 43 on transverse shafts 44. Separate vertically-movable slides 53, one for each register, are held by springs 56 in normally raised positions, with their shoulders 54 in engagement with a positioning stop 55. The rear slide 53 is pivotally connected at its lower end to one leg of a U-shaped lever 56ª, pivoted on shaft 57, which is supported in stationary brackets 58, 59 on the machine-frame. The forward leg 60 of this lever pivotally supports at its middle a yoke 61, having a rectangular opening through which the pin-bars 34 of the middle register pass. In its normally raised position this slide 53 is effective, through the connection described, to hold the pin-bars 34 of the middle register in raised position, with their pins 42 above the path of movement of the arms 43 on the rock-shafts.

The other slides 53 are pivoted at their lower ends to separate bell-crank-levers 62, which levers are pivoted upon the shaft 57 between the legs of the lever 56ª. These bell-cranks are connected through the links 63 to operate bell-cranks 64 mounted on the machine-frame. The respective bell-cranks 64 pivotally support yokes 61 surrounding the pin-bars 34 of the outer registers for normally holding these bars out of the paths of movement of the arms 43. When all of the pin-bars 34 are thus held up by said springs, no computation can take place.

Upon the carriage may be provided three cams 65, one for each of the vertical slides 53, to depress it against the tension of spring 56, thereby lowering the connected yoke 61 and bringing the pin-bars 34 into position to coact with the jack-trains while the carriage is in the computing zone. These cams may all be provided upon a single control block 66, when all of the registers are to be effective simultaneously. Each block 66 carries a denomination-selecting dog 51. The block 66 has jaws 70, whereby it may be set to any desired columnar position upon the rack 71 provided upon the typewriter for the tabulating mechanism.

Upon the lower part of the block may be formed a column-stop 72 to cooperate in the usual manner with the usual denomination-stops 73 of the tabulator.

At the upper end of each slide 53 is mounted a cam 74, pivoted between its ends to the slide and having a beveled upper face extending above the upper end of the slide. A spring 75, connected to the lower end of the cam 74 and to the slide, normally tends to force the lower end of the cam to its limit of movement in one direction, which limit is determined by engagement with a pin 76 on the slide.

When the carriage is entering a computing zone, the beveled faces of the cams 65 upon the control blocks 66 strike the beveled top faces of the cams 74, causing them and consequently the slides 53 to be thrust bodily downward. They are held down by the horizontal edges or dwells on the cams 65 until the carriage passes out of the computing zone. Upon the return of the carriage, the vertical end faces of the cams 65 strike against the upper portions of the cams 74 which are swung about their pivots against the pressure of the springs 75 and are restored thereby to normal vertical positions after the cams have passed.

Any one or any two cams may be omitted from the control block, so that, while the machine is being operated in the zone controlled by said block, any one or any two registers may be effective.

Figures 1, 2, 3:
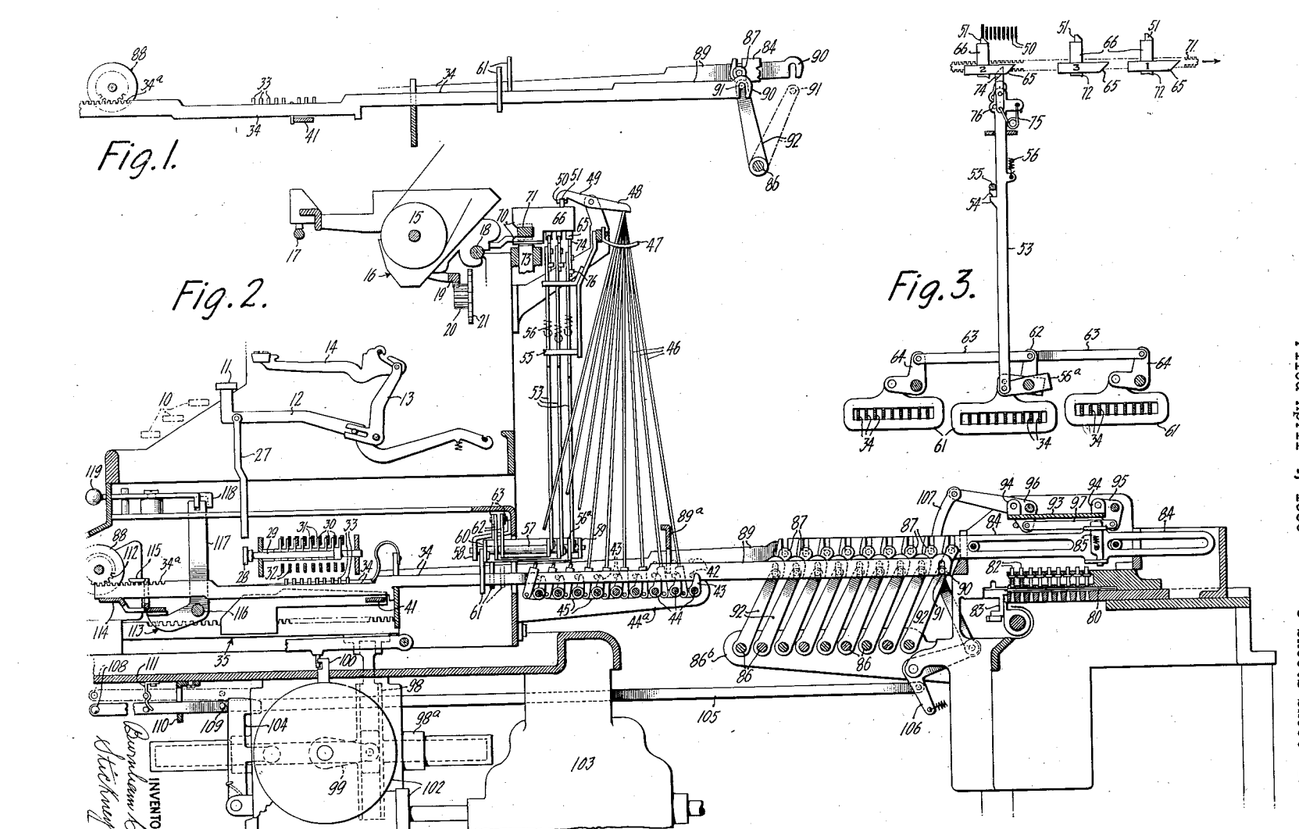
Figure 1 is a sectional longitudinal elevation, illustrating the method of driving a register-wheel by means of a rack, which has one of its pins selected and depressed to position for driving engagement by a general-operator bar. This rack is coupled to the device that sets the corresponding punch-selector.
Figure 2 is a sectional side elevation, taken about centrally of an Underwood bookkeeping machine having a power-driven general operator, and showing the present improvements applied thereto, the parts being all in normal positions, except one gang of pin-bars, which is dropped from silenced position to effective position, together with the couplers that set punch-operating plungers.
Figure 3 is a rear elevation of a rack which is provided upon the typewriter-carriage, and illustrates the selector-dog whereby the carriage elevates the jacks seriatim. It also shows the cams and dwells whereby the carriage controls the elevating and dropping of its various gangs of register-operating pin-bars.

There may be provided upon the carriage a series of control blocks 66, as shown in Figure 3. Since the block inserted in any of the positions shown may control the registers in any one of seven different ways, according to the cam or cams upon it, the possible modes of operation of the entire machine will be seven raised to the $n$th power, where "$n$" represents the number of control blocks actually employed. The machine is adapted to be set up in any way desired for difficult classes of work. The dwell portions of the cams may be of different lengths according to requirements, as seen at Figure 3. The connection-effecting cams 65 are placed one behind another upon the control block so as to be in position to depress the associated slides 53 which also stand one behind another.

At Figure 4 it will be seen that the first denominational jack-train includes the foremost rock-shaft 44, whose arms drive the left-hand pin-bars 34, these being the bars of highest denomination. The next jack-train to be operated by the carriage as it proceeds from right to left includes the next rearward rock-shaft which operates the pin-bars of the next to the highest denomination and so on, the last jack-train including the rear rock-shaft which operates the denominational pin-bars of lowest denomination.

According to the present invention, a card may be punched under the control of the already described indexing mechanism, by using only the single set of denomination-selecting jacks mentioned. Hence, upon typing in any zone, any one or more of the registers may be automatically operated, and the card may be automatically punched, without further burdening the typewriter-carriage or its driving spring. The punching is effected regardless of which register or how many registers are to be operated.

The card 80 is selectively perforated at 81 by the use of punches 82. These may be arranged in nine denominational columns, nine punches being included in each column, as in the pending application of Alfred G. F. Kurowski, Serial No. 307,586, filed September 22, 1928 (now Patent No. 1,909,770, dated May 16, 1933). The card is given appropriate denominational spacing and tabulating movements by means of a carriage 83, in the manner set forth in said Kurowski application. Over each column of punches extends a horizontal slide 84, in which is mounted a vertical punch-actuated plunger 85 that stands normally in idle position at the rear of the gang of punches.

Depression of any decimal-tabulator key 120 together with its key-lever 121 raises its plunger 73 in the path of the column-stops 72, and simultaneously operates a universal bar 122, to rock a shaft 123 and cause an arm 124 fixed to the shaft 123 to operate a link 125, which in turn operates the card-carriage escapement-mechanism 126.

This card-carriage escapement-mechanism includes suitable stop-pins 127, which may be set along a series of holes 128 in the card-carriage 83, said holes being spaced like the denominational card-column. The pins 127 co-operate with a vibratory dog-carrier 129 upon which is directly formed a holding dog 130. A pivoted stepping dog 131 normally holds the carriage by engaging the stop-pins 127. When the dog-carrier 129 is moved forwardly, the stepping dog 131 escapes, while the holding dog 130 momentarily holds the card-carriage 83. Upon forward movement of the dog-carrier 129, the holding dog is withdrawn from the pin 127 which it engaged, and the escapement-dog 131 now behind said latter pin may check the card-carriage by engaging the next pin 127 thereon. The dog-carrier 129 is guided for forward and rearward reciprocatory movement, and is connected at its forward end to an arm 132 fixed to a shaft 133. This shaft carries a second arm 134 to which the link 125 is connected. When the plunger 73 is operated, the link 125 is pulled forward by the arm 124, and thereby rocks the arm 134 together with its shaft 133 and the arm 132 to operate the dog-carrier 129, and cause the card-carriage to escape to its next column-position.

One of the improvements of the present invention resides in the means provided for selectively advancing the plungers 85 and determining the extent of each advance. For this purpose, there is arranged a bank of rock-shafts 86 extending horizontally across the machine, and each having an upwardly-extending arm 87, so that its slide 84 with its plunger 85 may be advanced by means of said rock-shaft. The rock-shafts are parallel, and the slides 84 are side by side, Figure 4. It will also be seen that the rock-shafts are placed one in front of another, and that the drive arms 87 thereon are arranged in echelon; the lengths of the slides 84 being graduated accordingly. In the illustration, the slide 84 of lowest denomination is the shortest, and is connected with the rearmost actuating arm 87, which is upon the rear shaft 86. Each shaft may be rotated to any degree independently of the others, and thereby the vertical plungers 85 may be set over any selected punches 82 in the various columns, all of the plungers being thus set before the punching is done.

The plunger-setting rock-shafts 86 are universal, that is to say, they may be operated in harmony with any active register 88, that is to say, when a number is to be run into any one of the three described registers, the plungers 85 in the single set may be indexed or adjusted accordingly. For this purpose, the bars 34, which are variously operated by the cross-bar 41 of the general operator, are connected to the rock-shafts 86 by means of rearwardly extending couplers 89, each extension or coupler having at its rear end a slotted part or coupling hook 90, which may be dropped into engagement with a pin 91 for operating its rock-shaft 86. These pins are fixed upon the tops of rock-arms 92. One rock-arm 92 is fixed upon each of said rock-shafts 86 and extends upwardly therefrom.

It will be understood that when any computing bars 34 are dropped from their normal idle positions into positions to be set by their rock-shafts 44, said couplers 89 also drop into engagement with the pins 91, so as to be made capable of pulling the arms 92 forward, and thereby rocking shafts 86. Thus they cause the drive arms 87 upon said shafts to pull forwardly the plunger slides 84 each to a point selected by the keys 11 through the described indexing mechanism, including parts 27 to 34, etc. Springs 91ª provided upon the shafts 86 keep the arms 92 in normal backward position, while the couplers 89 are disengaged from the pins 91. The shafts 86 are mounted upon brackets 86ª, 86ᵇ fastened on the machine-frame.

When any gang of bars 34 drops, it becomes connected in this manner to the rock-shafts 86, to drive the same, so that preparatory setting or indexing of the punch-operating plungers 85 is secured. This is true for any register that is to be affected by the general operator bar 41. The bars and couplers for one register act in harmony with those of another register or registers. The improvement does not interfere with or reduce the efficiency of the computing mechanism in any way; but the punch-operating plungers are set for each number whether the set number is to be carried into one register or another, or into any two registers, or into all three registers. If the number is to be carried into two registers, then two sets of couplers 89 will drop into mesh with pins 91. If the number is to be carried into three registers, then three sets of couplers 89 on bars 34 will drop into mesh with their pins 91. The result is the same whether one, two or three sets of bars drop into mesh with their pins 91. The provision of the three sets of couplers 89 makes it practicable to secure the automatic adjustment of the plunger-slides 84 by means of the general operator bar 41, independently of how many or which registers are to be advanced. A single setting of the selector-dog on the carriage suffices for all the registers and the punch-operators also.

Each set of operating arms 87 is arranged in echelon, the same being mounted upon the rock-shafts 86 which are arranged one forwardly of the other, and the couplers or extensions 89 of the pin-bars are accordingly graduated in length, the longest extension having the lowest denomination and being connected to the rearmost rock-shaft 86, which has the drive arm 87 of lowest denomination. It will be understood that the pendent rods 46 are operated by the typewriter-carriage, beginning with the highest denomination, although these rods 46 are not directly connected to the pin-bars 34, but instead are directly connected to the rock-shafts 44, whose arms 43 have the reverse denominational arrangement from the rods 46. Hence a right-hand coupling 89 at Figure 4 has the lowest denomination and is connected to the rearmost cross-shaft 86, which also has the lowest denomination, as well as its drive arm 87 and plunger-setting slide 84.

The extensions 89 are arranged in three groups extending to the three groups of pin-bars 34, Figure 4, and these groups are somewhat separate from one another in the Underwood bookkeeping machine, according to the spacing of the registers 88 from one another. The set of plunger-setting slides 84 is arranged between two of the groups of extensions 89, Figure 4, the drive arms 87 forming a group which has an echelon arrangement similar to the echelon arrangement of the set of operating arms 92 in the middle group, whereby the plunger-operating slides afford ample room without disturbing the usual arrangement of the registers in said Underwood machine. The extensions or couplers 89 may be guided in a comb-plate 89ª, see Figure 2.

The arms 87 may be longer than arms 92, so as to increase the extent of travel of plunger-operators 85 to conform to the spacing of the transverse rows of punches 82. The lateral spacing of the arms 87 may agree with that of the columns of punches, to permit the column-spaces on the cards 80 to be as narrow or wide as desired, independently of the lateral spacing of the computation bars 34; the latter being shown for example more widely spaced than the columns of punches. The use of the rock-shafts 86 permits either narrow or wide spacing of arms 87 relatively to arms 92, it being only necessary to set the arms at the desired locations on each shaft.

The manner of depressing punches is explained in said Kurowski application. This operation may be performed after the various digits have been run into the totalizer 88 by means of the racks 34ª. At this time said racks stand in an irregular array, depending upon which index-pins 33 have been projected below each rack for engagement with the forwardly-driving transverse general operator bar 41. The positions of the punch-operating plungers 85 will correspond with the positions of the racks, or, in other words, each plunger 85 selects a punch 82 for the number that has been added by its rack 34ª.

Depression of plungers, as set forth in said Kurowski application, is effected by power-driven universal plate 93, which is hung by means of ears 94 upon bell-cranks 95, 96, which are connected by a link 97 for simultaneous action. After depression of said operating plate 93, the same rises again, and the general operator 35 is returned to normal rear position, as set forth in said Kurowski application. The bars 34ª, 34, 89 are likewise returned to normal positions, as well as the slides 84 and the plungers 85.

The general operator 35 advances the pin-bars 34 and thereby runs the indexed numbers into the registers 88. A reciprocating member 98 guided in a housing 98ª and driven by a crank 99 gives the general operator 35 a forward motion to accumulate, and a backward motion to restore the pin-bars. This operating cycle is initiated by a trip 100 controlling a clutch, permitting the crank 99 to make one revolution. The clutch is driven by a motor 103 through a worm-drive 102. The trip 100 may be operated manually or automatically.

The punch-operators 85 are also individually adjusted or indexed at this operation. By the time that the crank 99 has nearly moved through its first half of a revolution, the reciprocating member 98 has practically reached its foremost position, that is, the pin-bars 34 have been advanced together with the couplers 89, and the plungers 85 have therefore been adjusted forwardly to their proper individual position above the die-pins 82.

At this time the crank 99 comes into contact with a pivoted arm 104. Further rotation of the crank 99 will transmit motion to a link 105 and over parts 106, 107, to depress the universal punch-operating platform 93, disclosed in said Kurowski application, for perforating the card 80.

In certain work, it is desired to be able to compute without having any holes punched in the card, and there is disclosed herein means to silence at will the driving connection to the punch-operating platform 93. To this end, the link 105 can be swung upwardly about its rear end by means of a handle 108, so that a pin 109 carried by the link 105 cannot be reached by the arm 104, and consequently there will be no punching operation.

The front end of link 105 may be guided in a bracket 110 fastened under the frame. A detent spring 111 serves to hold the link 105 in its idle position.

When a date or a numeral code is to be punched in the card 80 no computing is done, nevertheless use is made of one set of pin-bars 34 to bring selected plungers 85 above the proper die-pins 82, for such uncomputed date or code work. The front ends of the pin-bars 34 at this operation are lowered to silence the adding wheels, that is, the racks 34ª are temporarily dropped out of mesh with the register-gears 112 to avoid spurious accumulation in the register 88. For this purpose, the pin-bars 34 of one register are guided near the front on a bail 113 having a bottom rack-guide 114 and top rack-guides 115 in the form of lips bent off therefrom. The bail 113 is pivoted on a shaft 116 and has an upwardly-extending arm 117 forked at its end to engage a cam 118 provided on a hand-control lever 119. It will be noticed that operation of this lever will drop the bail 113 and disconnect the racks from the register-gears 112.

No claim is made to any feature shown in said Kurowski application 307,586, or Davis application 204,249 (now Patent No. 1,864,714, dated June 28, 1932), or Davis application 414,298, divided from said application 204,249 and filed December 7, 1929, the following claims being limited to combinations that are not disclosed in any of said applications, as to each of which this application is limited to improvements.

Variations may be resorted to within the scope of the invention, and portions of the improvements may be used without others.

Having thus described my invention, I claim:

1. In a combined typewriting, computing and punching machine having a set of punches, type-operating numeral-keys, and a carriage-mechanism controlled by the keys, the combination of an indexing mechanism controlled jointly by the keys and the carriage, a plurality of registers, sets of drivers therefor, a general operator, means driven thereby for operating any one or more of the sets of drivers selectively and according to the setting of the indexing mechanism, punch-selecting mechanism common to the sets of drivers and driven by said general operator through the medium of any selected set of drivers, and means to effect co-operation between the punch-selecting mechanism and the punches.

2. In a combined computing and punching machine having a carriage, a set of punches, numeral-keys, and a plurality of registers, a register-selecting mechanism controlled by the carriage, an indexing mechanism controlled jointly by the keys and the carriage, and a general operator for operating any one or more of the carriage-selected registers according to the setting of the indexing mechanism, a set of normally disconnected punch-selecting devices, means also under the control of the carriage for entraining the punch-selecting devices with the selected register, to be operated therewith, and means controlled by the general operator to effect co-operation between the punch-selecting mechanism and the punches.

3. In a combined typewriting, computing and punching machine having type-operating numeral-keys and a carriage controlled thereby, and also having a plurality of registers, the combination of sets of denominational bars, one set for each register, a single denomination selecting mechanism operable by the carriage and ramifying therefrom to all of the sets of denominational bars, means to place the various sets selectively under the control of the carriage, means operable by the keys for setting digit-pins upon denominational bars in the selected sets of bars, a general operator for driving the selected bars to operate the registers according to the indexing, a punch-selecting mechanism, there being means provided for entraining the punch-selecting mechanism with any set of pin-bars, to effect a punch-selection automatically at the operation of any register, a set of punches, and means for operating the selected punches.

4. In a combined, computing and punching machine having numeral-keys and a carriage controlled thereby, and also having a plurality of registers, the combination of a carriage-controlled denomination-determining mechanism, an indexing mechanism, means controlled selectively by the carriage for enabling said indexing mechanism to govern any one or more of the registers, said indexing mechanism including digit-indexing means operable by the keys, means for cycling the selected registers according to the indexing, a punch-selecting mechanism, means connected to the register-selecting means, for entraining the punch-selecting mechanism with the cycling means, to effect punch-selection automatically at the cycling of any register, a set of punches, and means for operating the selected punches.

5. In a combined computing and punching machine having numeral-keys and a carriage controlled thereby, and also having a plurality of registers, the combination of sets of denomination-bars for the various registers, digit-index-devices for said bars, all operable by said keys, punch-selecting mechanism, a set of denomination selecting devices controlled by the carriage and connectible to any set or sets of denomination-bars, means also controlled by the carriage for placing under the control of the denomination-selecting devices any set of denomination-bars and concomitantly connecting said punch-selecting mechanism to the selected denomination-bars, a general operator for driving the selected register or registers according to the indexing and concomitantly adjusting said punch-selecting mechanism, a set of punches, and means for operating the adjusted punch-selecting mechanism to effect the punching.

6. In a computing and punching machine having numeral-keys and a carriage controlled thereby, and also having a plurality of registers, the combination of a set of denomination-selecting devices controlled by said carriage, a system of transverse rock-shafts operable by said denomination-selecting devices, selectable sets of denomination-bars for said registers, means for enabling any selected set of denomination-bars to be put under the control of said rock-shafts, key-controlled index-devices for said bars, a general operator for operating the selected register or registers according to the indexing, a set of punch-selectors, there being means for entraining the punch-selectors with any selected set of said denomination-bars, means for operating the punch-selectors, and a set of punches operable by said punch-selectors.

7. In a typewriting, computing and punching machine having type-operating numeral-keys and a carriage controlled thereby, and also having a plurality of registers, the combination of denomination-selecting devices controlled by said carriage, and including selective sets of denomination-bars for said registers, digit-indexing means, means for enabling any set of denomination-bars to be put under the control of said indexing means, a general operator for operating the selected register or registers according to the indexing, a set of punch-selectors, a set of rock-shafts for operating said punch-selectors, devices being provided that are effective at the selection of denomination-bar sets for automatically entraining the rock-shafts with the selected set of denomination-bars, means for operating the punch-selectors and a set of punches operable by said punch-selectors.

8. In a computing and punching machine having numeral-keys and a carriage controlled thereby, and also having a plurality of registers, the combination of a set of denomination-selecting devices controlled by said carriage, selectable sets of denomination-bars for said registers, key-controlled index-devices for said bars, a general operator for operating the selected register or registers, a set of punch-selectors, a set of rock-shafts having individual arms for operating said punch-selectors, means for enabling the carriage to select any set of denomination-bars and automatically connect the rock-shafts to the selected set of denomination-bars, and a set of punches operable by said punch-selectors, said punch-selectors and arms being compactly positioned between adjacent sets of denomination-bars and connected laterally thereto by the rock-shafts.

9. In a combined computing and punching machine having a set of punches, and also having numeral-keys, a carriage and a plurality of registers, the combination of denomination-selecting mechanism controlled by the carriage, sets of denomination-bars, said selecting mechanism including means for giving preliminary movements to the denomination-bars, shiftable means for normally maintaining the sets of denomination-bars out of the range of movement of the denomination-selecting mechanism, said shiftable means being under the control of the carriage to permit the denomination-selecting mechanism to move the denomination-bars for different registers simultaneously, digit-indexing devices controlled by the keys for said bars, and punch-selecting mechanism connectible to said denomination-bars by the movement of said shiftable means, said punches being operable under the control of said punch-selecting mechanism.

10. In a computing and punching machine, in combination, a series of registers, index pin-bars, denomination-selecting mechanism consisting of a set of jacks, rods and rock-shafts common to the registers, a series of arms on each rock-shaft, one for each register, having fixed paths of movement for engaging and moving the index pin-bars of the same denomination in the different registers, a separate mechanism for maintaining the pin-bars of each register out of the paths of movement of the rock-shaft arms and individually operable to lower them into said paths, a punch-selecting mechanism normally disconnected from the pin-bars but connectible thereto by the operation of said separate mechanism, punches controllable by said punch-selecting mechanism, and a general operator for driving the registers, the punch-selecting mechanism and the punches.

11. In a computing and punching machine, in combination, a series of registers, index pin-bars, denomination-selecting mechanism for moving the pin-bars of any selected register or registers at one time, mechanism controlling the pin-bars of different registers separately to move them into and out of operative relation to the denomination-selecting mechanism, a set of punch-selecting devices also under the control of said pin-bar controlling mechanism, a general operator having means to drive the pin-bars to operate the registers and the punch-selecting devices, and a set of punches controlled by the punch-selecting devices.

12. In a combined typewriting, computing and punching machine having a single set of punches and a single set of punch-selectors and also having type-operating numeral-keys, a carriage and a plurality of selectable registers, the combination of sets of index pin-bars for said registers, denomination-determining mechanism ramifying from and controlled by said carriage for adjusting the corresponding pin-bars of any number of selected registers simultaneously, means to enable the sets of pin-bar mechanism for different registers to be brought separately and selectively into and out of operative relation with said ramifying denomination-determining mechanism, there being means provided for concomitantly entraining the set of punch-selectors with the effective pin-bars, and means for operating the registers and the punch-selectors by said pin-bars, said punches being operable by said punch-selectors.

13. In a combined typewriting, computing and punching machine having a set of punches and also having type-operating numeral-keys, a carriage and a plurality of registers, the combination with a denomination-selector controlled by the carriage, of a set of jacks operated thereby and universal to said registers, a rod being operated by each jack, a rock-shaft being connected to each rod to be rocked thereby, sets of arms being provided on each rock-shaft, sets of denomination pin-bars, one set for each register, a set of punch-selectors normally disengaged from the pin-bars, each pin-bar being movable to operative indexing position by means of rock-shaft arm, means normally holding the pin-bars beyond the paths of the rock-shaft arms and out of connection with said punch-selectors, means controlled by the carriage for enabling the arms to co-operate with the pin-bars, a general operator for advancing the pin-bars to drive the registers and the punch-selectors according to the indexing, and means for operating the punches under control of the punch-selectors.

14. In a combined typewriting, computing and punching machine having a single set of punches and a single set of punch-selectors and also having type-operating numeral-keys, a carriage and a plurality of registers, the combination of key-controlled indexing devices including sets of pin-bars, a single denomination-determining mechanism controlled by the carriage and common to the registers and having a series of trains, each train including a rock-shaft extending transversely of the machine for connection with a pin-bar in each register, means for operating the various selected registers by the pin-bars, and means for connecting the various sets of pin-bars to the single set of punch-selectors for concomitant setting of the latter according to the setting of the indexing devices.

15. In a combined typewriting, computing and punching machine having a set of punches and also having type-operating numeral-keys, a carriage and a series of registers, the combination of a set of carriage-selected denominational computing elements for each register arranged in one denominational sequence, denomination-selecting mechanism for said computing elements and including a set of individual devices arranged in the reverse denominational sequence, a set of transposing rock-shafts common to the several registers and operable by said devices, key-operated digit-indexing devices, a set of punch-selectors, controlling means arranged to cause all of the registers to be effective in one computing zone at one time and a part of the registers to be effective in another computing zone at another time and the punch-selectors to be effective in both of said computing zones, and a general operator for driving the registers and the punch-selectors according to the indexing.

16. In a combined computing and punching machine having a set of punches and also having numeral-keys, a carriage and a plurality of registers, sets of key-controlled indexing devices, one set for each register and arranged in one denominational order, a single set of denomination-selecting jacks controlled by the carriage and common to all of the registers and having a reverse denominational order, a set of transposing rock-shafts extending crosswise of all of the indexing devices, a set of connections from the jacks to the rock-shafts, means for selectively connecting the rock-shafts to the indexing devices of the several registers, a set of punch-selectors normally disconnected, and means for connecting the punch-selectors to any of said sets of indexing devices.

17. The combination with a set of punches, of a set of punch-selectors having actuating rock-shafts extending transversely of the machine, key-controlled indexing mechanism including groups of denomination-bars, said groups side by side, registers driven by said denomination-bars, and means for coupling any group of denomination-bars to said actuating rock-shafts, to drive the same according to the indexing.

18. The combination with a set of punches, of a set of punch-selectors having actuating rock-shafts extending transversely of the machine, key-controlled indexing mechanism including groups of denomination-bars, said groups side by side, and registers driven by said denomination-bars, any group of denomination-bars being connectible to said actuating rock-shafts, to drive the same according to the indexing, said actuating rock-shafts having arms provided with wrists, and said denomination-bars having normally disengaged couplers for establishing connection with said wrists.

19. The combination with a plurality of registers, and a set of punches, of a set of punch-selectors having actuating rock-shafts extending transversely of the machine, key-controlled indexing mechanism including groups of register-actuating denomination-bars, said groups side by side, a letter-spacing key-controlled carriage, and means controlled by said carriage for bringing into use any group of denomination-bars and concomitantly connecting the selected group or groups to said actuating rock-shafts.

20. The combination of a plurality of registers, a set of punches, a set of punch-selectors, groups of key-controlled register-actuating denomination mechanism, and means for selectively connecting said punch-selectors to any of said groups of denomination mechanism, to control the indexing of the punch-selectors thereby.

21. The combination with a set of punches, of a set of punch-selectors, a computing mechanism including a key-controlled carriage whereby computing may be done in different zones in a plurality of registers, a single set of carriage-controlled denomination-determining devices common to said registers, digit-indexing mechanism controlled by the keys, and means for bringing said punch-selectors and any selected register concomitantly under the control of said single set of carriage-controlled selecting devices.

22. In a typewriting, computing and punching machine having type-operating numeral-keys and a carriage controlled thereby, and also having a plurality of registers, the combination of a set of denomination-selecting devices controlled by said carriage, a system of transverse rock-shafts operable by said denomination-selecting devices, sets of denomination-bars for said registers, means for enabling any set of denomination-bars to be put under the control of said rock-shafts, key-controlled index-devices for said bars, a general operator for operating the selected register or registers according to the indexing, a set of punch-selectors, means for connecting the punch-selectors with any selected set of said denomination-bars, means for operating the punch-selectors, a set of punches operable selectively by said punch-selectors, and means for silencing the denomination-bars by lowering their ends to be out of range with the registers, so that the latter are silenced during the operation of the punch-selectors.

23. The combination of a set of punches, indexable operators for said punches, a set of transverse rock-shafts, arms on said rock-shafts and operated thereby and connected to said operators, each rock-shaft also carrying a plurality of arms whereby it may be operated, sets of register-driving means, indexing means therefor, and means for connecting the register-driving means for any register to corresponding shaft-operating arms.

24. The combination of a set of punches, indexable operators for said punches, a set of transverse rock-shafts, arms on said rock-shafts and operated thereby and connected to said operators, each rock-shaft also carrying a plurality of other arms whereby it may be operated, sets of register-driving means, indexing means therefor, and means for connecting the register-driving means for any register to corresponding shaft-operating arms, said rock-shafts being placed one in front of another, and said punch-operators being in the form of slides of lengths graded to the first set of arms.

25. The combination of a set of punches, indexable operators for said punches, a set of transverse rock-shafts, operating arms on said rock-shafts and connected to said operators, groups of register-driving means, indexing means therefor, said register-driving means having groups of rearward extensions, each extension formed at its rear end with a coupling hook, said operating arms having pins to be engaged by said hooks, said groups of extensions being separated, and said punch-operators occupying a position between the groups and connected laterally thereto by means of said rock-shafts.

26. In a combined typewriting, computing and punching machine having a carriage, a plurality of registers, type-operating numeral-keys, an indexing mechanism controlled jointly by the keys and the carriage, register-selecting means ramifying from the carriage to said registers, and a general operator, the combination of sets of devices driven by the general operator for operating any registers selected by said carriage-mechanism according to the setting of the indexing mechanism, a single set of punches, a set of punch-selecting devices, trains ramifying from the punch-selecting devices back to the sets of register-operating devices to be driven thereby concomitantly with the carriage-selected registers, and means also controlled by the general operator to effect co-operation between the punch-selecting devices and the punches.

27. The combination with a plurality of registers and indexing mechanism therefor, including selectively usable sets of denomination-bars whereby the registers are selectively operated according to the indexing, of a set of punches, a set of punch-selectors located bodily alongside of a set of denomination-bars, transverse rock-shafts having sets of operating arms connectible selectively to the denomination-bars, there being one rock-shaft for each denomination, and drive arms upon said rock-shafts and connected individually to the set of punch-selectors, said rock-shafts serving as cross-connections between the selected denomination-bars and the punch-selectors.

28. The combination with a plurality of registers and indexing mechanism therefor, including selectively usable sets of denomination-bars whereby the registers are operated selectively according to the indexing, of a set of punches, a set of punch-selectors, a set of transverse rock-shafts having sets of operating arms connectible selectively to the denomination-bars, there being one rock-shaft for each denomination, said rock-shafts forming cross-connections between the selected denomination-bars and the punch-selectors, and drive arms upon said rock-shafts and connected individually to the set of punch-selectors, the lateral spacing of the punches being substantially less than that of each set of denomination-bars, and the said operating and drive arms being correspondingly disposed upon the rock-shafts.

29. The combination with a plurality of registers and indexing mechanism therefor, including selectively usable sets of denomination-bars whereby the registers are operated selectively according to the indexing, of a set of punches, a set of punch-selectors, a set of transverse rock-shafts having sets of operating arms connectible selectively to the denomination-bars, there being one rock-shaft for each denomination, said rock-shafts forming cross-connections between the selected denomination-bars and the punch-selectors, and drive arms upon said rock-shafts and connected individually to the set of punch-selectors, the arms on each rock-shaft which are connectible to the denomination-bars being of a different length from the arm upon the same shaft which connects to the punch-selector, so that the travel of each denomination-bar is of a different length from the travel of the punch-selector.

30. The combination of a plurality of registers, individual indexing sets therefor, a set of transverse rock-shafts controllable by any of said indexing sets, arms upon said rock-shafts, a set of punch-operators settable by said arms, means for connecting any of said indexing sets with said rock-shafts, a set of punches, and means to operate the connected indexing set to run into the corresponding register the amount indexed, and simultaneously index the punch-operators.

BURNHAM C. STICKNEY.